United States Patent
Cheong et al.

(10) Patent No.: US 9,450,270 B2
(45) Date of Patent: *Sep. 20, 2016

(54) RECHARGEABLE LITHIUM BATTERY

(75) Inventors: Kwang-Jo Cheong, Yongin-si (KR);
Yong-Beom Lee, Yongin-si (KR);
Hee-Sun Yun, Yongin-si (KR); Soo-Mi Eo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 686 days.

This patent is subject to a terminal disclaimer.

(21) Appl. No.: 12/910,708

(22) Filed: Oct. 22, 2010

(65) Prior Publication Data

US 2011/0117430 A1    May 19, 2011

(30) Foreign Application Priority Data

Nov. 13, 2009  (KR) .................. 10-2009-0109969

(51) Int. Cl.
*H01M 10/02*      (2006.01)
*H01M 10/0525*   (2010.01)
*H01M 4/587*      (2010.01)
(Continued)

(52) U.S. Cl.
CPC ......... *H01M 10/0525* (2013.01); *H01M 4/587* (2013.01); *H01M 4/621* (2013.01); *H01M 4/622* (2013.01); *H01M 10/0565* (2013.01); *H01M 2300/0085* (2013.01); *Y02E 60/122* (2013.01)

(58) Field of Classification Search
CPC ................ H01M 10/0525; H01M 10/0565; H01M 10/056; H01M 10/0564; H01M 2300/0082; H01M 2300/0088
See application file for complete search history.

(56) References Cited

U.S. PATENT DOCUMENTS

| | | |
|---|---|---|
| 5,718,989 A | 2/1998 | Aoki et al. |
| 7,223,501 B2 | 5/2007 | Jung et al. |
| 7,241,534 B2 | 7/2007 | Nishimura et al. |

(Continued)

FOREIGN PATENT DOCUMENTS

| | | |
|---|---|---|
| CN | 1855604 A | 11/2006 |
| EP | 1 347 462 A1 | 9/2003 |

(Continued)

OTHER PUBLICATIONS

EPO Search Report dated Jun. 21, 2006, for European Patent application 06112896.3, (4 pages).

(Continued)

*Primary Examiner* — Ula C Ruddock
*Assistant Examiner* — Amanda Barrow
(74) *Attorney, Agent, or Firm* — Lewis Roca Rothgerber Christie LLP

(57) ABSTRACT

A rechargeable lithium battery includes a positive active material for intercalating and deintercalating lithium ions; a negative electrode including a negative active material for intercalating and deintercalating lithium ions; and a polymer electrolyte including a polymer, a non-aqueous organic solvent and a lithium salt. The rechargeable lithium battery has a battery capacity per unit area of the positive electrode from about 3.3 mAh/cm$^2$ to about 2.8 mAh/cm$^2$. The polymer includes a first monomer represented by the following Chemical Formula 1 and a second monomer represented by at least one of the following Chemical Formulae 2 to 7 at a weight ratio of about 85:15 to about 50:50 of the first monomer to the second monomer. In the above Chemical Formulae 1 to 7, each compound is as described in the detailed description.

8 Claims, 1 Drawing Sheet

(51) Int. Cl.
*H01M 4/62* (2006.01)
*H01M 10/0565* (2010.01)

(56) References Cited

U.S. PATENT DOCUMENTS

| | | | |
|---|---|---|---|
| 9,059,479 B2 * | 6/2015 | Cheong | H01M 10/0525 |
| 2003/0157407 A1 | 8/2003 | Kosuzu et al. | |
| 2003/0232240 A1 * | 12/2003 | Lee | C08J 5/20 |
| | | | 429/122 |
| 2006/0003232 A1 | 1/2006 | Jung et al. | |
| 2006/0029853 A1 * | 2/2006 | Kobayashi et al. | 429/33 |
| 2006/0040182 A1 * | 2/2006 | Kawakami et al. | 429/218.1 |
| 2006/0078801 A1 * | 4/2006 | Yamaguchi et al. | 429/326 |
| 2006/0240326 A1 * | 10/2006 | Lee et al. | 429/306 |
| 2007/0009806 A1 | 1/2007 | Kim | |
| 2007/0042274 A1 * | 2/2007 | Muraoka et al. | 429/332 |
| 2007/0275302 A1 | 11/2007 | Sotowa et al. | |
| 2013/0065138 A1 * | 3/2013 | Takahata et al. | 429/338 |

FOREIGN PATENT DOCUMENTS

| | | |
|---|---|---|
| EP | 1 508 934 A1 | 2/2005 |
| EP | 1 524 709 A2 | 4/2005 |
| EP | 1 715 542 A1 | 10/2006 |
| JP | 09-237631 | 9/1997 |
| JP | 11-265616 | 9/1999 |
| JP | 2000-311516 | 11/2000 |
| JP | 2003-068138 | 3/2003 |
| JP | 2003-147218 | 5/2003 |
| JP | 2003-217340 | 7/2003 |
| JP | 2003-249264 | 9/2003 |
| JP | 2005-038722 | 2/2005 |
| JP | 2005-072003 | 3/2005 |
| JP | 2006-302885 | 11/2006 |
| JP | 2007-042620 | 2/2007 |
| KR | 2003-0087080 | 11/2003 |
| KR | 10-2004-0020633 | 3/2004 |
| KR | 10-0525278 | 10/2004 |
| KR | 10-2005-0014408 | 2/2005 |
| KR | 10-2006-0001742 | 1/2006 |
| KR | 10-2006-0110635 | 10/2006 |
| KR | 10-2007-0014677 | 2/2007 |
| KR | 10-2007-0021078 | 2/2007 |
| KR | 10-0770081 | 10/2007 |
| KR | 10-0859628 | 9/2008 |

OTHER PUBLICATIONS

JPO Office action dated Sep. 29, 2009 for Japanese Patent application 2006-105448, (3 pages).
EPO Search Report dated Mar. 25, 2011 corresponding to European Patent application 10189872.4, (7 pages).
SIPO Office action dated Mar. 8, 2013, with English translation, for Chinese Patent application 20100541012.7, (15 pages).
U.S. Office action dated Jul. 17, 2013 for cross reference U.S. Appl. No. 12/899,422 (now U.S. Pat. No. 9,059,479), (16 pages).
SIPO Office action dated Oct. 22, 2013, with English translation, for Chinese Patent application 20100541012.7, (12 pages).
SIPO Office action dated Feb. 18, 2014, with English translation, for Chinese Patent application 20100541012.7, (15 pages).
Patent Abstracts of Japan, and English machine translation of Japanese Publication 2006302885 dated Nov. 2, 2006, listed above, (26 pages).

* cited by examiner

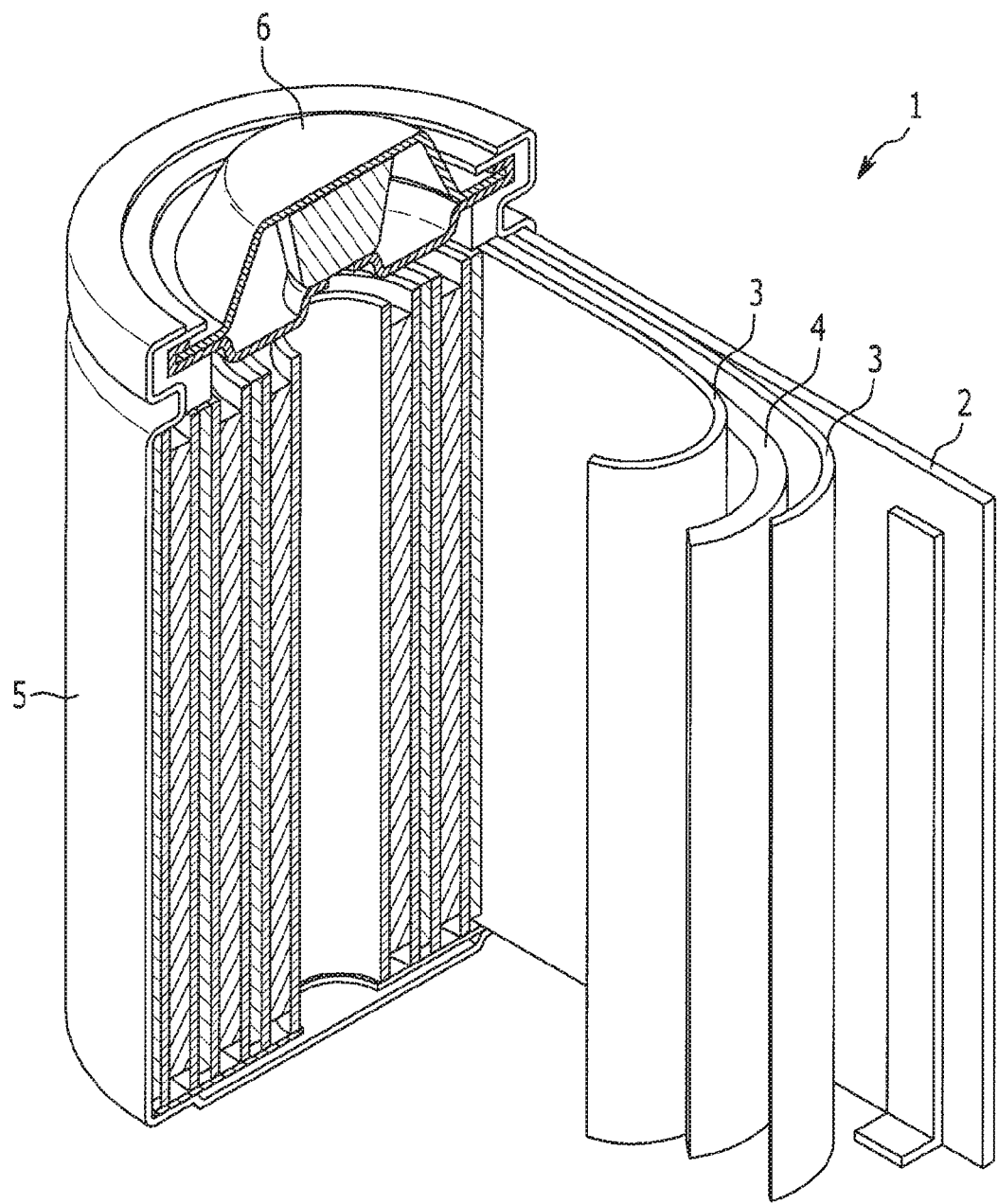

RECHARGEABLE LITHIUM BATTERY

CROSS-REFERENCE TO RELATED APPLICATION

This application claims priority to and the benefit of Korean Patent Application No. 10-2009-0109969, filed in the Korean Intellectual Property Office on Nov. 13, 2009, the entire content of which is incorporated herein by reference.

BACKGROUND

1. Field

The following description relates to a rechargeable lithium battery.

2. Description of the Related Art

In recent times, due to reductions in the size and weight of portable electronic equipment in accordance with developments of the electronic industries, use of such portable electronic equipment has become increasingly popular. A battery having a high energy density is needed for use as a power source in such portable electronic equipment. Rechargeable lithium batteries have a high energy density, thus research into rechargeable lithium batteries has been actively conducted.

Lithium-transition element oxides that are capable of intercalating and deintercalating lithium ions have been used as a positive active material of a rechargeable lithium battery. Various crystalline or amorphous carbon-based materials or carbon composites have been used as a negative active material. To fabricate positive or negative electrodes, either the positive or negative active materials are coated on a current collector at an appropriate thickness and length, or the positive or negative active materials are made in the form of a film.

The positive and negative electrodes are then wound or stacked while interposing an insulating separator therebetween to fabricate an electrode assembly. The electrode assembly is enclosed in a can or another case, and an electrolyte solution is injected to fabricate a prismatic rechargeable battery. Compared to using a can as a battery container, using a pouch as a battery container is advantageous in that the shape may be flexibly changed and the size of the container may be increased.

However, the pouch-type battery container is disadvantageous in that it may be easily deformed and damaged by an external physical impact and it may become swollen when exposed to a high temperature. Such disadvantages are more serious in a rechargeable lithium battery using a liquid electrolyte solution than in a rechargeable lithium battery using a polymer electrolyte.

Therefore, a polymer electrolyte rechargeable lithium battery is typically used in a battery having a pouch-type battery container. The polymer electrolyte rechargeable lithium battery has the advantages that it does not leak, it is safe, it is stable at high temperatures and it may resist an external physical impact to some extent. However, when the physical strength of the battery is increased in order to increase the resistance against an external physical impact, the performance of the battery may be compromised due to an increase in the internal resistance of the battery.

SUMMARY

An aspect of an embodiment of the present invention is directed toward a rechargeable lithium battery that can withstand an external physical impact, has a high capacity and has a relatively high battery performance.

According to an embodiment of the present invention, a rechargeable lithium battery includes a positive electrode including a positive active material for intercalating and deintercalating lithium ions; a negative electrode including a negative active material for intercalating and deintercalating lithium ions; and a polymer electrolyte including a polymer, a non-aqueous organic solvent and a lithium salt. The rechargeable lithium battery has a battery capacity per unit area of the positive electrode from about 3.3 mAh/cm$^2$ to about 2.8 mAh/cm$^2$. The polymer includes a polymerization product of a first monomer represented by the following Chemical Formula 1 and a second monomer represented by at least one of the following Chemical Formulae 2 to 7 at a weight ratio of about 85:15 to about 50:50 of the first monomer to the second monomer.

        Chemical Formula 1

In the above Chemical Formula 1, U is a moiety of polyesterpolyol, which is produced by a condensation reaction of at least one of an alcohol derivative including 2 to 6 hydroxyl (OH) groups at the terminal positions and at least one of a dicarboxylic acid derivative, and has a weight average molecular weight of about 100 to about 10,000,000; and A and B are identical or different, and are each selected from the group consisting of $CH_2$=CR—C(=O)—, $CH_2$=CR—O—$CH_2$—, $CH_2$=CR—, $CH_2$=CR—O—C(=O)—, $CH_2$=CR—$CH_2$—, $CH_2$=CR—$CH_2$—O—, $CH_2$=CH—S(=O)$_2$— and $CH_2$=CR—C(=O)—O—$CH_2CH_2$—NH—C(=O)—, where R is H, a C1 to C10 hydrocarbon, or a C6 to C10 aromatic hydrocarbon.

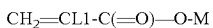        Chemical Formula 2

        Chemical Formula 3

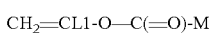        Chemical Formula 4

$CH_2$=CH—$CH_2$—O-M        Chemical Formula 5

        Chemical Formula 6

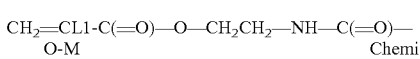        Chemical Formula 7

In the above Chemical Formulae 2 to 7, L1 is H, a C1 to C10 hydrocarbon or a C6 to C10 aromatic hydrocarbon, and M is a C1 to C20 hydrocarbon, a C1 to C20 halogenated hydrocarbon, a C6 to C20 aromatic hydrocarbon or a C6 to C20 halogenated aromatic hydrocarbon.

U may include at least one compound selected from the group consisting of a first repeating unit represented by the following Chemical Formula 8a, a second repeating unit represented by the following Chemical Formula 8b, and a third repeating unit represented by the following Chemical Formula 8c:

Chemical Formula 8a

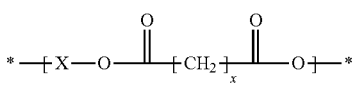

Chemical Formula 8b

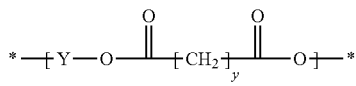

Chemical Formula 8c

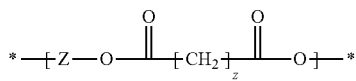

wherein in the above Chemical Formulae 8a to 8c,

X, Y, and Z are identical or different, and are each a moiety of an alcohol derivative used for the preparation of polyester polyol and a moiety of the alcohol derivative such as ethylene glycol, polyethylene glycol, propyleneglycol, polypropylene glycol, diethylene glycol, alkane diol, ethoxylated alkane diol, propoxylated alkanediol, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A or propoxylated bisphenol A; and x, y, and z are identical or different and are each an integer from 1 to 20.

The first monomer and the second monomer may be mixed at a 75:25 to 60:40 weight ratio.

The carbon-based negative active material may be a carbon-based negative active material. In one embodiment, the carbon-based negative active material may be a crystalline carbon. In another embodiment, the carbon-based negative active material may be natural graphite.

In one embodiment, the binder may be a water-soluble binder, and examples thereof include a styrene-butadiene rubber, an acrylated styrene-butadiene rubber, sodium polyacrylate, a copolymer of propylene and a C2 to C8 olefin, a copolymer of (meth)acrylic acid and (meth)acrylic acid alkyl ester and combinations thereof.

Hereinafter, further embodiments will be described in detail.

The rechargeable lithium battery according to one embodiment has a relatively high battery strength and a high capacity.

BRIEF DESCRIPTION OF THE DRAWING

The accompanying drawing, together with the specification, illustrates exemplary embodiments of the present invention, and, together with the description, serves to explain the principles of the present invention.

The drawing is a schematic view of a rechargeable lithium battery according to one embodiment.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

The rechargeable lithium battery according to one embodiment includes a positive electrode, a negative electrode and a polymer electrolyte. In one embodiment, the battery capacity of the battery is from about 3.10 to about 2.8 mAh/cm$^2$. When the battery capacity is within the stated range, a relatively high physical strength of the battery, an improved charge and discharge capacity and an increased cycle life during charge and discharge may be realized.

As used herein, a battery capacity refers to a value obtained by dividing a charge and discharge capacity in mAh by an area of a positive electrode in cm$^2$. Thus, the battery capacity has units of capacity per unit area.

The polymer electrolyte includes a polymer obtained from a polymerization of a first monomer represented by the following Chemical Formula 1 and a second monomer represented by at least one of the following Chemical Formulae 2 to 7. The first monomer and the second monomer may be polymerized at a weight ratio of about 85:15 to about 50:50. In one embodiment, the first monomer and the second monomer may be polymerized at a weight ratio of about 75:20 to about 60:40. When the ratio of the first monomer to the second monomer is within the stated range, sufficiently improved battery strength and cycle life may be realized.

A-U—B           Chemical Formula 1

In the above Chemical Formula 1, U is a moiety of polyesterpolyol, which is produced by a condensation reaction of at least one of an alcohol derivative including 2 to 6 hydroxyl (OH) groups at the terminal positions and at least one of a dicarboxylic acid derivative, and has a weight average molecular weight of about 100 to about 10,000,000; and in one embodiment, A and B are identical or different and each is $CH_2$=CR—C(=O)—, $CH_2$=CR—O—$CH_2$—, $CH_2$=CR—, $CH_2$=CR—O—C(=O)—, $CH_2$=CR—$CH_2$—, $CH_2$=CR—$CH_2$—O—, $CH_2$=CH—S(=O)$_2$— and/or $CH_2$=CR—C(=O)—O—$CH_2CH_2$—NH—C(=O)—, where R may be hydrogen, a C1 to C10 hydrocarbon or a C6 to C10 aromatic hydrocarbon. In one embodiment, A and B are identical or different, and each is $CH_2$=CR—C(=O)—, $CH_2$=CR—, $CH_2$=CR—$CH_2$—, $CH_2$=CH—S(=O)$_2$— and/or $CH_2$=CR—C(=O)—O—$CH_2CH_2$—NH—C(=O)—. In another embodiment, A and B are identical or different, and each is $CH_2$=CR—C(=O)—, $CH_2$=CR—, $CH_2$=CH—S(=O)$_2$— and/or $CH_2$=CR—C(=O)—O—$CH_2CH_2$—NH—C(=O)—.

The monomer represented by the above Chemical Formula 1 may have a weight average molecular weight of about 16,000 to about 20,000.

| | |
|---|---|
| $CH_2$=CL1-C(=O)—O-M | Chemical Formula 2 |
| $CH_2$=CL1-O-M | Chemical Formula 3 |
| $CH_2$=CL1-O—C(=O)-M | Chemical Formula 4 |
| $CH_2$=CH—$CH_2$—O-M | Chemical Formula 5 |
| $CH_2$=CH—S(=O)$_2$-M | Chemical Formula 6 |
| $CH_2$=CL1-C(=O)—O—$CH_2CH_2$—NH—C(=O)—O-M | Chemical Formula 7 |

In the above Chemical Formulae 2 to 7, L1 may be H, a C1 to C10 hydrocarbon or a C6 to C10 aromatic hydrocarbon; M may be a C1 to C20 hydrocarbon, a C1 to C20 halogenated hydrocarbon, a C6 to C20 aromatic hydrocarbon, or a C6 to C20 halogenated aromatic hydrocarbon.

In one embodiment, the compound represented by the above Chemical Formula 2 is used as the second monomer.

The alcohol derivative for the preparation of the polyesterpolyol may be ethyleneglycol, polyethyleneglycol, propyleneglycol, polypropyleneglycol, alkane diol, ethoxylated alkane diol, propoxylated alkanediol, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A and/or propoxylated bisphenol A.

In one embodiment, the dicarboxylic acid derivative includes succinic acid, glutaric acid, adipic acid, suberic acid, azelaic acid, sebacic acid, decane dicarboxylic acid, maleic acid, fumaric acid, phthalic acid, isophthalic acid and/or terephthalic acid.

Non-limiting examples of the first monomer represented by Chemical Formula 1 include a monomer including U, where U includes at least one compound selected from the group consisting of a first repeating unit represented by the following Chemical Formula 8a, a second repeating unit represented by the following Chemical Formula 8b and a third repeating unit represented by the following Chemical Formula 8c; and A and B, where A and B are as indicated above. Herein, when at least two of the first repeating unit, the second repeating unit and the third repeating unit are included, the repeating units may be regularly arranged or randomly arranged.

Chemical Formula 8a

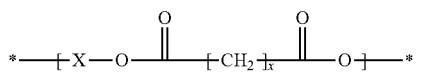

Chemical Formula 8b

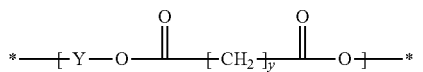

Chemical Formula 8c

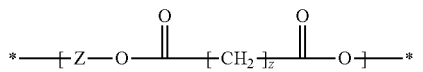

In the above Chemical Formulae 8a to 8c according to one embodiment, X, Y, and Z are identical or different, and each is a moiety of an alcohol derivative used for the preparation of polyesterpolyol, where the moiety of the alcohol derivative is ethylene glycol, polyethylene glycol, propyleneglycol, polypropylene glycol, diethylene glycol, alkane diol, ethoxylated alkane diol, propoxylated alkanediol, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A and/or propoxylated bisphenol A; and x, y and z are identical or different and are each an integer from 1 to 20.

When the mole numbers of the first repeating unit, the second repeating unit and the third repeating unit are l, m and n, respectively, each of the mole numbers may have a value equal to or greater than 0. In another embodiment, each of the mole numbers l, m and n may have a value equal to or greater than 1. Also, the l, m and n values may be suitably adjusted based on a target molecular weight of a first monomer. Each of the l, m and n values is from 1 to 35 in consideration of both the target number average molecular weight of the first monomer, which is from about 6,000 to about 8,000, and the weight average molecular weight of the first monomer, which is from about 16,000 to about 19,000.

The polymer electrolyte may include a non-aqueous organic solvent and a lithium salt that are suitable for use in a liquid electrolyte solution.

The lithium salt may supply lithium ions in the battery, operate a basic operation of a rechargeable lithium battery and improve lithium ion transport between the positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI and/or $LiB(C_2O_4)_2$ (lithium bisoxalate borate, "LiBOB"). The lithium salt may be used at a 0.1 to 2.0M concentration. When the lithium salt is included at the stated concentration range, electrolyte performance and lithium ion mobility may be enhanced due to optimal viscosity and electrolyte conductivity.

The non-aqueous organic solvent may include a carbonate-based, ester-based, ether-based, ketone-based, alcohol-based, and/or aprotic solvent.

Examples of the carbonate-based solvent may include dimethyl carbonate ("DMC"), diethyl carbonate ("DEC"), dipropyl carbonate ("DPC"), methylpropyl carbonate ("MPC"), ethylpropyl carbonate ("EPC"), methylethyl carbonate ("MEC"), ethylene carbonate ("EC"), propylene carbonate ("PC"), butylene carbonate ("BC") and the like.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone and the like.

Examples of the ether-based solvent include dibutyl ether, tetraglyme, diglyme, dimethoxyethane, 2-methyltetrahydrofuran, tetrahydrofuran and the like.

Examples of the ketone-based solvent include cyclohexanone and the like.

Examples of the alcohol-based solvent include ethyl alcohol, isopropyl alcohol and the like.

Examples of the aprotic solvent include nitriles such as R—CN wherein R is a C2 to C20 linear, branched, or cyclic hydrocarbon, an aromatic ring or an ether bond; amides such as dimethylformamide; dioxolanes such as 1,3-dioxolane; sulfolanes and the like.

The non-aqueous organic solvent may be used singularly or in a mixture. When the non-aqueous organic solvent is used in a mixture, the mixture ratio can be adjusted in accordance with a desired battery performance.

The carbonate-based solvent may include a mixture of a cyclic carbonate and a linear carbonate. The cyclic carbonate and the linear carbonate may be mixed together at a volume ratio of 1:1 to 1:9. When a mixture within the stated ratio is used as an electrolyte solution, the electrolyte solution performance may be enhanced. In one embodiment, the non-aqueous organic solvent includes a carbonate-based solvent. In another embodiment, the non-aqueous organic solvent includes a mixture of ethylene carbonate and ethylmethyl carbonate. When a mixture of ethylene carbonate and ethylmethyl carbonate is used as a non-aqueous organic solvent, a dielectric constant of an organic solvent is improved, electrolyte solution impregnation properties into an electrode is improved due to low viscosity, and the charge and discharge capacity and battery strength are improved. In one embodiment, the ethylene carbonate and ethylmethyl carbonate are mixed at a volume ratio of about 10:90 to about 50:50.

In addition, the electrolyte solution of one embodiment further includes mixtures of carbonate-based solvents and aromatic hydrocarbon-based solvents. The carbonate-based solvents and the aromatic hydrocarbon-based solvents may be mixed together at the volume ratio of 1:1 to 30:1.

The aromatic hydrocarbon-based organic solvent may be represented by the following Chemical Formula 9.

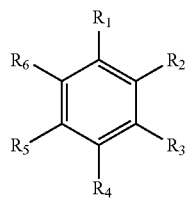

Chemical Formula 9

In the above Chemical Formula 9 according to one embodiment, $R_1$ to $R_6$ are identical or different, and are each selected from the group consisting of hydrogen, halogens, C1 to C10 alkyls, C1 to C10 haloalkyls and combinations thereof.

The aromatic hydrocarbon-based organic solvent may include, but is not limited to, at least one compound selected from the group consisting of benzene, fluorobenzene, 1,2-difluorobenzene, 1,3-difluorobenzene, 14-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene and combinations thereof.

The non-aqueous electrolyte may further include vinylene carbonate or an ethylene carbonate-based compound represented by the following Chemical Formula 10 in order to improve the cycle life of a battery.

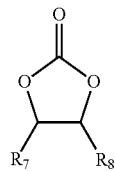

Chemical Formula 10

In the above Chemical Formula 10 according to one embodiment, $R_7$ and $R_8$ are identical or different, and are each selected from the group consisting of hydrogen, halogens, cyano (CN), nitro ($NO_2$), a C1 to C5 fluoroalkyl and combinations thereof, provided that at least one of $R_7$ and $R_8$ is a halogen, a nitro ($NO_2$) or a C1 to C5 fluoroalkyl, and $R_7$ and $R_8$ are not both hydrogen.

In one embodiment, the ethylene carbonate-based compound includes difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate or a combination thereof. The amount of ethylene carbonate-based compound used for improving the cycle life of the battery may be adjusted within a suitable range.

The polymer electrolyte according to one embodiment is prepared by polymerizing the first monomer with the second monomer. Herein, a polymerization reaction may be implemented using a polymerization initiator. In other words, a polymer electrolyte composition including the first monomer, the second monomer, the polymerization initiator, a non-aqueous organic solvent and a lithium salt is polymerized to thereby prepare a polymer electrolyte according to one embodiment.

As for the polymerization initiator, any material that initiates polymerization of monomers without deteriorating battery performance may be used. Non-limiting examples of the polymerization initiator include an organic peroxide, an azo-based compound and a mixture thereof.

Examples of the organic peroxide include peroxy dicarbonates such as di(4-t-butylcyclohexyl) peroxy dicarbonate, di-2-ethylhexyl peroxy dicarbonate, di-isopropyl peroxy dicarbonate, di-3-methoxy butyl peroxy dicarbonate, t-butyl peroxy isopropyl carbonate, t-butyl peroxy 2-ethylhexyl carbonate, 1,6-bis(t-butyl peroxycarbonyloxy)hexane, diethylene glycol-bis(t-butyl peroxy carbonate) and the like; diacyl peroxides such as diacetyl peroxide, dibenzoyl peroxide, dilauroyl peroxide, bis-3,5,5-trimethyl hexanoyl peroxide and the like; and peroxy esters such as perhexyl pivalate, t-butyl peroxy pivalate, t-amyl peroxy pivalate, t-butyl peroxy-2-ethyl-hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecarbonate, 1,1,3,3-tetramethyl butyl 2-ethylhexanoate, t-amyl peroxy 2-ethyl hexanoate, t-butyl peroxy isobutyrate, t-amylperoxy 3,5,5-trimethyl hexanoate, t-butyl peroxy 3,5,5-trimethyl hexanoate, t-butyl peroxy acetate, t-butyl peroxy benzoate, di-butylperoxy trimethyl adipate and the like.

Examples of the azo-based compound include 2,2'-azo-bis(isobutyronitrile), 2,2'-azo-bis(2,4-dimethylvaleronitrile) and 1,1'-azo-bis(cyanocyclo-hexane).

The polymerization initiator is added to the polymerization reaction composition in an amount that may initiate the polymerization reaction of the monomers. In one embodiment, the amount of the polymerization initiator is from about 50 ppm to about 1000 ppm based on the total weight of the first monomer, the second monomer, the lithium salt and the non-aqueous organic solvent. The mixture including the first monomer, the second monomer, the lithium salt and the non-aqueous organic solvent is also called the pre-gel. Also, in one embodiment the amount of the polymerization initiator is from about 200 ppm to about 400 ppm based on the total weight of the first monomer, the second monomer, the lithium salt and the non-aqueous organic solvent. When the included amount of the polymerization initiator is within the stated range, the polymerization initiator is consumed during the polymerization process. Thus, the polymerization initiator may not remain in the prepared polymer electrolyte. This is important because when the polymerization initiator is a peroxide-based compound, $CO_2$ gas may be generated. Also, when the polymerization initiator is an azo-based compound, $N_2$ gas may be generated. The absence of the polymerization initiator in the polymerized electrolyte prevents any sub-reactions such as generation of gas due to the two reactions stated above. Also, adding an appropriate amount of the polymerization initiator to the polymerization reaction mixture ensures an appropriate degree of polymerization.

In an embodiment, the rechargeable lithium battery using the polymer electrolyte composition is prepared by fabricating an electrode assembly using a suitable process to include a positive electrode, a separator and a negative electrode; inserting the electrode assembly into a battery case; injecting a polymer electrolyte composition into the battery case; and curing the polymer electrolyte composition in the battery case. Since the polymerization reaction between the first monomer and the second monomer is initiated by the polymerization initiator included in the polymer electrolyte composition during the curing process to thereby form a polymer, the final battery includes an electrolyte existing in the form of polymer. The battery case may be a metal can or a metal-laminated pouch.

The negative electrode of the rechargeable lithium battery according to one embodiment includes a negative active material capable of intercalating and deintercalating lithium ions, for example a carbon-based negative active material. A non-limiting example of the carbon-based negative active material includes a crystalline carbon. In one embodiment, the carbon-based negative active material is natural graphite. When natural graphite is used as the negative active material, it is economical. Further, it may be possible to improve the battery capacity by using natural graphite as the negative active material.

In one embodiment, the negative electrode includes a binder.

In one embodiment, the binder includes a non-water-soluble binder, a water-soluble binder or a combination thereof. The water-soluble binder may improve charge and discharge capacity. Further, the water-soluble binder may provide for an easier and more environmentally-friendly negative electrode fabrication process.

In one embodiment, the non-water-soluble binder includes carboxymethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene or a combination thereof.

In one embodiment, the water-soluble binder includes a styrene-butadiene rubber, an acrylated styrene-butadiene rubber, sodium polyacrylate, a copolymer of propylene and a C2 to C8 olefin, a copolymer of (meth)acrylic acid and (meth)acrylic acid alkyl ester or a combination thereof.

When the negative electrode binder includes a water-soluble binder, the negative electrode may further include a cellulose-based compound to provide greater viscosity. In one embodiment, the cellulose-based compound includes carboxylmethyl cellulose, hydroxypropylmethyl cellulose, methyl cellulose, alkali metal salts thereof or a combination thereof. The alkali metal may be Na, K or Li. In one embodiment, the cellulose-based compound may be included in an amount of 0.1 to 3 parts by weight based on 100 parts by weight of the binder.

The negative electrode may further include a conductive material to improve conductivity. As for the conductive material, any electro-conductive material that does not cause a chemical change, either in itself or in any other component of the battery, may be used. Non-limiting examples of the conductive material include a carbon-based material, e.g., natural graphite, artificial graphite, carbon black, acetylene black, ketjenblack and carbon fiber; a metal-based material, e.g., a metal fiber or a metal powder such as copper, nickel, aluminum and silver; a conductive polymer, e.g., polyphenylene derivative; and mixtures thereof.

In one embodiment, the negative electrode includes a current collector, and the current collector includes a copper foil, a nickel foil, a stainless steel foil, a titanium foil, a nickel foam, a copper foam, a polymer substrate coated with a conductive metal or combinations thereof.

In one embodiment, the positive electrode includes a current collector and a positive active material layer disposed on the current collector. In one embodiment, the positive active material includes lithium-containing compounds that reversibly intercalate and deintercalate lithium ions. The positive active material may include lithium as well as a composite oxide including at least one selected from the group consisting of cobalt, manganese and nickel. In particular, the following lithium-containing compounds may be used:

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $LiE_{2-b}X_bO_{4-c}D_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < a < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_fMn_{1-g}X_gPO_4$ ($0.90 \leq f \leq 1.8$, $0 \leq g \leq 0.5$); $QO_2$; $QS_2LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$.

In the above Chemical Formulae according to one embodiment, A is Ni, Co, Mn or a combination thereof; X is Al, Ni, Co, Mn, Cr, Fe, Mg, Sr, V, a rare earth element or combination thereof; D is O, F, S, P or a combination thereof; E is Co, Mn or a combination thereof; T is F, S, P or a combination thereof; G is Al, Cr, Mn, Fe, Mg, La, Ce, Sr, V or a combination thereof; Q is Ti, Mo, Mn or a combination thereof; Z is Cr, V, Fe, Sc, Y or a combination thereof; and J is V, Cr, Mn, Co, Ni, Cu or a combination thereof.

The lithium-containing compound may have a coating layer on the surface or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element and a hydroxycarbonate of a coating element. The coating element compound for the coating layer may be amorphous or crystalline. The coating element for the coating layer may include Mg, Al, Co, K, Na, Ca, Si, Ti, V, Sn, Ge, Ga, B, As, Zr or a mixture thereof. The coating layer may be formed by a method having no adverse influence on properties of a positive active material by including these elements in the compound. For example, the method may include any suitable coating method such as spray coating, dipping and the like.

In one embodiment, the positive active material layer also includes a binder and/or a conductive material.

The binder may improve binding properties of particles of the positive active material to one another and to a current collector. Examples of the binder include but are not limited to polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon and the like.

The conductive material may improve electrode conductivity. Any electrically conductive material may be used as a conductive material unless it causes a chemical change, either in itself or in any other component of the battery. Examples of the conductive material include natural graphite, artificial graphite, carbon black, acetylene black, ketjenblack, carbon fiber, a metal powder or a metal fiber including copper, nickel, aluminum, silver and the like and combinations thereof. The conductive material may also be used along with a polyphenylene derivative.

The current collector may be Al but is not limited thereto.

In one embodiment, the negative and positive electrodes are fabricated by a method including mixing the negative or positive active material, the conductive material and the binder into an active material composition and coating the active material composition on a current collector.

The solvent for manufacturing a positive electrode may be any suitable solvent that can disperse an active material, a conductive material and a binder. In one embodiment, the solvent may be N-methylpyrrolidone. When a binder for a negative electrode is a water-soluble binder, the solvent may be water.

The rechargeable lithium battery according to one embodiment may be manufactured to be a cylindrical, prismatic, or pouch (laminate-type) battery. A cylindrical rechargeable lithium battery is shown in the drawing. The drawing illustrates a cylindrical rechargeable lithium battery 1, which includes a negative electrode 2, a positive electrode 3, a separator 4 interposed between the negative electrode 2 and the positive electrode 3, an electrolyte impregnating the separator 4, a battery case 5 and a sealing member 6 sealing the battery case 5.

The following examples illustrate embodiments of the present invention in more detail. These examples, however, do not limit the scope of the present invention.

Example 1

A mixed solvent includes ethylene carbonate ("EC"), ethylmethyl carbonate ("EMC") and diethyl carbonate ("DEC") at a volume ratio of 30:20:50 volume percent ("vol %"). 1.3 mole/L of $LiPF_6$ is added to the mixed solvent to make, for example, a 1.3M electrolyte solution. 7 weight percent ("wt %") of a mixed monomer is added to 93 wt % of the electrolyte solution to make a pre-gel solution. The mixed monomer includes a first monomer whose weight average molecular weight is about 18,000 and a second monomer represented by the following Chemical Formula 2a, e.g., hexylacrylate, at a mixing ratio of about 75:25 wt % of the first monomer to the second monomer. The first monomer includes a first repeating unit represented by the following Chemical Formula 8a, a second repeating unit represented by the following Chemical Formula 8b and a third repeating unit represented by the following Chemical Formula 8c, and has both terminals being A and B, where A is $CH_2$=CR—C(=O)—O—$CH_2CH_2$—NH—C(=O)— and B is $CH_2$=CR—C(=O)—O—$CH_2CH_2$—NH—C(=O)—, and where R is $CH_3$.

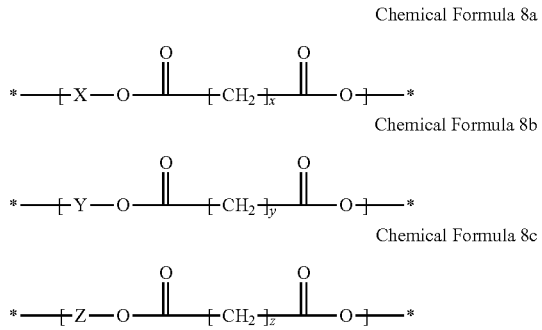

Chemical Formula 8a

Chemical Formula 8b

Chemical Formula 8c

In the above Chemical Formulae 8a, 8b and 8c, X, Y, and Z are moieties derived from ethylene glycol, diethylene glycol, and trimethylolpropane, respectively.

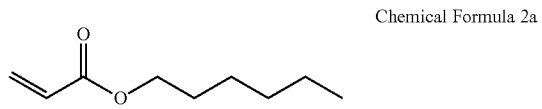

Chemical Formula 2a 2,2'-azobis(isobutyronitrile), an azo-based polymerization initiator, is added to the pre-gel at a concentration of 350 ppm based on the weight of the pre-gel to prepare a polymer electrolyte composition.

2.7 g of the polymer electrolyte composition is injected into a battery assembly fabricated to include a positive electrode, a negative electrode and a separator. The battery is aged for about 16 hours. The aged battery is then sealed in a vacuum and baked in an oven at about 75° C. for about 4 hours to thereby fabricate a laminated rechargeable lithium battery cell. During the heating process, a polymerization reaction occurs, thus preparing a polymer electrolyte inside the rechargeable lithium battery cell.

The positive electrode is fabricated through a suitable process by mixing a $LiCoO_2$ positive active material, an acetylene black conductive material and a polyvinylidene fluoride binder at a mixing ratio of about 96:2:2 wt % in N-methylpyrrolidone solvent to thereby prepare a positive active material slurry; applying the positive active material slurry to a current collector, which is an aluminum (Al) foil; and pressing the current collector coated with the positive active material slurry. The active mass density of the positive electrode is adjusted to obtain a battery cell including a positive electrode having a battery capacity per unit area of 3.15 $mAh/cm^2$.

The negative electrode is fabricated through a suitable process by mixing natural graphite, a styrene butadiene rubber binder and a carboxylmethyl cellulose thickener in water to thereby prepare a negative active material slurry; applying the negative active material slurry to a current collector, which is a copper (Cu) foil; and pressing the current collector coated with the negative active material slurry. The natural graphite and styrene butadiene rubber binder are mixed at a ratio of 97:3 wt %, and the carboxylmethyl cellulose thickener is used at an amount of 1 parts by weight based on 100 parts by weight of the styrene butadiene rubber binder.

The rechargeable lithium battery cell has about 3.15 mAh/cm² of battery capacity per unit area of the positive electrode and a 1 C capacity during a capacity assessment test ("nominal capacity") of about 1200 mAh.

Example 2

A rechargeable lithium battery cell is fabricated according to the same method as in Example 1, except that the first monomer and the second monomer are used at a ratio of 71:29 wt %.

Example 3

A rechargeable lithium battery cell is fabricated according to the same method as in Example 1, except that the first monomer and the second monomer are used at a ratio of 68:32 wt %.

Example 4

A rechargeable lithium battery cell is fabricated according to the same method as in Example 1, except that the first monomer and the second monomer are used at a ratio of 64:36 wt %.

Example 5

A rechargeable lithium battery cell is fabricated according to the same method as in Example 1, except that the first monomer and the second monomer are used at a ratio of 61:39 wt %.

Example 6

A rechargeable lithium battery cell is fabricated according to the same method as in Example 1, except that the first monomer and the second monomer are used at a ratio of 57:43 wt %.

Example 7

A rechargeable lithium battery cell is fabricated according to the same method as in Example 1, except that the first monomer and the second monomer are used at a ratio of 54:46 wt %.

Example 8

A rechargeable lithium battery cell is fabricated according to the same method as in Example 1, except that the first monomer and the second monomer are used at a ratio of 50:50 wt %.

Example 9

A rechargeable lithium battery cell is fabricated according to the same method as in Example 1, except that an electrolyte solution including 93 wt % of 1.3M LiPF$_6$ dissolved in a mixed solvent including ethylene carbonate and ethylmethyl carbonate at a volume ratio of 30:70 volume % is used instead of an electrolyte solution including 93 wt % of 1.3M LiPF$_6$ dissolved in a mixed solvent of ethylene carbonate, ethylmethyl carbonate, and diethyl carbonate at a volume ratio of 30:20:50 vol %.

Example 10

A rechargeable lithium battery cell is fabricated according to the same method as in Example 9, except that the rechargeable lithium battery cell has about 2.90 mAh/cm² of battery capacity per unit area of the positive electrode. The battery capacity per unit area of the positive electrode is adjusted by controlling the active mass density of the positive electrode.

Example 11

A rechargeable lithium battery cell is fabricated according to the same method as in Example 10, except that the first monomer and the second monomer are used at a ratio of 71:29 wt %.

Example 12

A rechargeable lithium battery cell is fabricated according to the same method as in Example 10, except that the first monomer and the second monomer are used at a ratio of 68:32 wt %.

Example 13

A rechargeable lithium battery cell is fabricated according to the same method as in Example 10, except that the first monomer and the second monomer are used at a ratio of 64:36 wt %.

Example 14

A rechargeable lithium battery cell is fabricated according to the same method as in Example 10, except that the first monomer and the second monomer are used at a ratio of 61:39 wt %.

Example 15

A rechargeable lithium battery cell is fabricated according to the same method as in Example 9, except that the rechargeable lithium battery cell has about 3.30 mAh/cm² of battery capacity per unit area of the positive electrode. The battery capacity per unit area of the positive electrode is adjusted by controlling the active mass density of the positive electrode.

Example 16

A rechargeable lithium battery cell is fabricated according to the same method as in Example 9, except that the rechargeable lithium battery cell has about 2.80 mAh/cm² of battery capacity per unit area of the positive electrode. The battery capacity per unit area of the positive electrode is adjusted by controlling the active mass density of the positive electrode.

Comparative Example 1

A rechargeable lithium battery cell is fabricated according to the same method as in Example 10, except that the first monomer and the second monomer are used at a ratio of 100:0 wt %.

Comparative Example 2

A rechargeable lithium battery cell is fabricated according to the same method as in Example 9, except that the rechargeable lithium battery cell has about 2.60 mAh/cm² of battery capacity per unit area of the positive electrode. The battery capacity per unit area of the positive electrode is adjusted by controlling the active mass density of the positive electrode.

Comparative Example 3

A rechargeable lithium battery cell is fabricated according to the same method as in Example 9, except that the rechargeable lithium battery cell has about 3.40 mAh/cm$^2$ of battery capacity per unit area of the positive electrode. The battery capacity per unit area of the positive electrode is adjusted by controlling the active mass density of the positive electrode.

The physical properties of the lithium battery cells fabricated according to Examples 1 to 6 and Comparative Examples 1 to 3 are measured as follows.

Capacity Evaluation

A battery cell is charged and discharged under the conditions of the following steps (1) to (3). After charging and discharging under the conditions of steps (1) to (3), i.e. three charge-discharge cycles, a battery discharge capacity is measured.

In step (1), a battery cell is 4.2V/20 mA cut-off charged at a charge rate of 0.2 C and discharged to 2.75V at a discharge rate of 0.2 C, where 1 C is the rate at which 1 coulomb is charged in 1 hour.

In step (2), a battery cell is 4.2V/20 mA cut-off charged at a charge rate of 0.5 C and discharged to 2.75V at a discharge rate of 0.2 C.

In step (3), a battery cell is 4.2V/0.1 C cut-off charged at a charge rate of 0.5 C and discharged to 3V at a discharge rate of 0.5 C.

Strength Evaluation at Room Temperature (25° C.)

A battery cell is 4.2V/20 mA cut-off charged at a charge rate of 0.20 and discharged to 2.75V at a discharge rate of 0.2 C. The battery cell is constant current charged on a condition of 1 C/36 minutes and the battery cell is evaluated based on a 3 point bending mode with a Universal Test Machine ("UTM") "Instron". The strength of the battery cell is evaluated by measuring a maximum load (N) applied when the battery cell is bent to 3 mm in a longitudinal direction at a speed of 5 mm/min. The span length, which is a distance between cradles for holding a battery cell, is obtained by subtracting 3 mm from the width of the battery cell on both the right and left sides.

Cycle Life at Room Temperature (25° C.)

A battery cell is 4.2V/0.1 C cut-off charged at a charge rate of 1 C and discharged to 3V at a discharge rate of 1 C. The charge and discharge cycle is repeated 300 times. Discharge capacity after a 300th charge and discharge cycle is divided by 1200 mAh to obtain percent (%) of cycle life efficiency.

The battery strengths, battery discharge capacities, and room temperature cycle life efficiencies measured in the above-described methods are shown in the following Table 1. In the following Table 1, EC denotes ethylene carbonate, EMC denotes ethylmethyl carbonate, and DEC denotes diethyl carbonate.

TABLE 1

| | Weight ratio | | Battery Capacity | Non- | | | |
|---|---|---|---|---|---|---|---|
| | First monomer wt % | Second monomer wt % | Per unit area (mAh/cm$^2$) | Aqueous Organic solvent | Battery Capacity (mAh) | Battery strength | Cycle life % |
| Example 1 | 75 | 25 | 3.15 | EC/EMC/DEC | 1249 | 221 | — |
| Example 2 | 71 | 29 | 3.15 | EC/EMC/DEC | 1251 | 229 | — |
| Example 3 | 68 | 32 | 3.15 | EC/EMC/DEC | 1256 | 244 | — |
| Example 4 | 64 | 36 | 3.15 | EC/EMC/DEC | 1254 | 236 | — |
| Example 5 | 61 | 39 | 3.15 | EC/EMC/DEC | 1243 | 196 | — |
| Example 6 | 57 | 43 | 3.15 | EC/EMC/DEC | 1240 | 184 | — |
| Example 7 | 54 | 46 | 3.15 | EC/EMC/DEC | 1225 | 173 | — |
| Example 8 | 50 | 50 | 3.15 | EC/EMC/DEC | 1218 | 158 | — |
| Example 9 | 75 | 25 | 3.15 | EC/EMC | 1255 | 278 | 81 |
| Example 10 | 75 | 25 | 2.90 | EC/EMC | 1286 | 254 | 94 |
| Example 11 | 71 | 29 | 2.90 | EC/EMC | 1289 | 271 | 94 |
| Example 12 | 68 | 32 | 2.90 | EC/EMC | 1285 | 250 | — |
| Example 13 | 64 | 36 | 2.90 | EC/EMC | 1285 | 237 | — |
| Example 14 | 61 | 39 | 2.90 | EC/EMC | 1283 | 210 | — |
| Example 15 | 75 | 25 | 3.30 | EC/EMC | 1247 | 262 | 78 |
| Example 16 | 75 | 25 | 2.80 | EC/EMC | 1287 | 250 | 94 |
| Comparative Example 1 | 100 | 0 | 2.90 | EC/EMC | 1162 | 153 | — |
| Comparative Example 2 | 75 | 25 | 2.60 | EC/EMC | 1164 | 155 | 94 |
| Comparative Example 3 | 75 | 25 | 3.40 | EC/EMC | 1232 | 269 | 63 |

As shown in Table 1, when the battery capacity per unit area is 3.15 mAh/cm$^2$, Example 3 using the first monomer and the second monomer at a mixing ratio of 68:32 wt % shows maximum battery strength. When the non-aqueous organic solvent includes ethylene carbonate and ethylmethyl carbonate of 30:70 volume %, battery strength increases, as in Example 12.

Comparing Example 9 with Example 10, in which the first monomer to the second monomer ratio is the same and the non-aqueous organic solvents have the same composition, the cycle life of Example 10 is greater than that of Example 9. The difference between Example 9 and Example 10 is that Example 10 has a 2.90 mAh/cm$^2$ battery capacity per unit area, which is lower than the 3.15 mAh/cm$^2$ battery capacity per unit area of Example 9. Thus, a decrease in battery capacity per unit area appears to improve the cycle life of the battery.

When the battery capacity per unit area of a positive electrode increases, the internal resistance of a battery increases. Internal resistance significantly increases at a high charge rate of 0.5 C or 1 C, resulting in deposition of lithium on a surface of a negative electrode during the charge process. Thereby, battery capacity and cycle life may be reduced. Comparative Example 3, where the battery capacity per unit area of a positive electrode is 3.40 mAh/cm$^2$, shows a reduced battery capacity and a significantly lower cycle life than Examples 10 to 16, which have battery capacities per unit area of a positive electrode of 2.90 mAh/cm$^2$ and 2.80 mAh/cm$^2$, respectively.

Therefore, the battery capacity per unit area of a positive electrode is to be controlled within a desired range. However, Comparative Example 1, which uses only the first monomer, shows a lower battery capacity and a reduced battery strength despite having a battery capacity per unit area within the desired range. This indicates that the presence of both the first monomer and the second monomer appears to improve the battery capacity and increase the battery strength.

Although the first monomer and the second monomer are mixed at a desired range, the battery capacity and the battery strength may still be reduced in cases where the battery capacity per unit area of a positive electrode is low, e.g. 2.60 mAh/cm$^2$, as in Comparative Example 2.

When the battery capacity per unit area of a positive electrode is controlled within a desired range and the first monomer and the second monomer are mixed within a desired range, battery properties having desired properties may be obtained.

As shown in Table 1, Example 11, which has a battery capacity of 2.90 mAh/cm$^2$ and has the first and second monomers mixed at a ratio of 71:29 wt %, shows relatively high battery strength, battery capacity, and cycle life efficiency.

While the present invention has been described in connection with certain exemplary embodiments, its is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable lithium battery comprising:
a positive electrode comprising a positive active material for intercalating and deintercalating lithium ions;
a negative electrode comprising a negative active material for intercalating and deintercalating lithium ions; and
a polymer electrolyte comprising a polymer, a non-aqueous organic solvent and a lithium salt,
wherein the rechargeable lithium battery has a battery capacity per unit area of the positive electrode of 3.15 mAh/cm$^2$, and
the polymer comprises a polymerization product of a first monomer represented by the following Chemical Formula 1 and a second monomer represented by at least one of the following Chemical Formulae 2 to 7, wherein the first monomer is included in an amount not greater than 68 percent and not less than 64 percent based on the total weight of the first monomer and the second monomer:

A-U—B          Chemical Formula 1 wherein, U is a moiety of polyesterpolyol, and
A and B are identical or different, and are each selected from the group consisting of $CH_2$=CR—C(=O)—, $CH_2$=CR—O—$CH_2$—, $CH_2$=CR—, $CH_2$=CR—O—C(=O)—, $CH_2$=CR—$CH_2$—, $CH_2$=CR—$CH_2$—O—, $CH_2$=CH—S(=O)$_2$— and $CH_2$=CR—C(=O)—O—$CH_2CH_2$—NH—C(=O)—, where R is H, a C1 to C10 hydrocarbon or a C6 to C10 aromatic hydrocarbon,

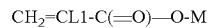          Chemical Formula 2

          Chemical Formula 3

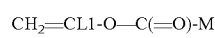          Chemical Formula 4

          Chemical Formula 5

          Chemical Formula 6

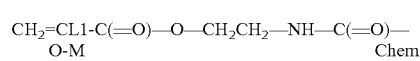          Chemical Formula 7 wherein in the above Chemical Formulae 2 to 7, L1 is H, a C1 to C10 hydrocarbon or a C6 to C10 aromatic hydrocarbon, and M is a C1 to C20 hydrocarbon, a C1 to C20 halogenated hydrocarbon, a C6 to C20 aromatic hydrocarbon or a C6 to C20 halogenated aromatic hydrocarbon.

2. The rechargeable lithium battery of claim 1, wherein U comprises at least one compound selected from the group consisting of a first repeating unit represented by the following Chemical Formula 8a, a second repeating unit represented by the following Chemical Formula 8b, and a third repeating unit represented by the following Chemical Formula 8c:

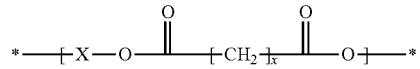

Chemical Formula 8a

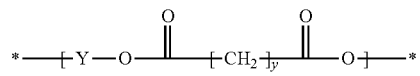

Chemical Formula 8b

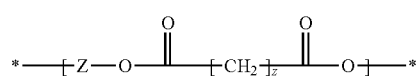

Chemical Formula 8c wherein in the above Chemical Formulae 8a to 8c,
X, Y, and Z are identical or different, and are each a moiety of an alcohol derivative used for the preparation of polyester polyol and a moiety of the alcohol derivative such as ethylene glycol, polyethylene glycol, propyleneglycol, polypropylene glycol, diethylene glycol, alkane diol, ethoxylated alkane diol, propoxylated alkanediol, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A or propoxylated bisphenol A; and
x, y, and z are identical or different and are each an integer from 1 to 20.

3. The rechargeable lithium battery of claim 1, wherein the second monomer is represented by Chemical Formula 2.

4. The rechargeable lithium battery of claim 1, wherein the negative active material is a carbon-based negative active material.

5. The rechargeable lithium battery of claim 1, wherein the negative active material is a crystalline carbon.

6. The rechargeable lithium battery of claim 1, wherein the negative active material is natural graphite.

7. The rechargeable lithium battery of claim 1, wherein the negative electrode comprises a water-soluble binder.

8. The rechargeable lithium battery of claim 1, wherein the negative electrode comprises a binder and the binder comprises a styrene-butadiene rubber, an acrylated styrene-butadiene rubber, sodium polyacrylate, a copolymer of propylene and a C2 to C8 olefin, a copolymer of (meth)acrylic acid and (meth)acrylic acid alkyl ester or a combination thereof.

* * * * *